US010462870B2

(12) United States Patent
Qiang et al.

(10) Patent No.: US 10,462,870 B2
(45) Date of Patent: Oct. 29, 2019

(54) LIGHT SOURCE CIRCUIT AND ILLUMINATION APPARATUS

(71) Applicant: OPPLE LIGHTING CO., LTD., Shanghai (CN)

(72) Inventors: Jie Qiang, Shanghai (CN); Zhixian Zhou, Shanghai (CN)

(73) Assignee: OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 16/054,097

(22) Filed: Aug. 3, 2018

(65) Prior Publication Data

US 2018/0343720 A1 Nov. 29, 2018

Related U.S. Application Data

(63) Continuation of application No. PCT/CN2017/071552, filed on Jan. 18, 2017.

(30) Foreign Application Priority Data

Feb. 3, 2016 (CN) .......................... 2016 1 0079053
Feb. 3, 2016 (CN) ..................... 2016 2 0114044 U

(51) Int. Cl.
*F21K 9/64* (2016.01)
*F21V 9/30* (2018.01)
(Continued)

(52) U.S. Cl.
CPC ........... *H05B 33/0857* (2013.01); *F21K 9/64* (2016.08); *F21V 9/30* (2018.02); *F21V 23/04* (2013.01); *F21Y 2113/10* (2016.08)

(58) Field of Classification Search
None
See application file for complete search history.

(56) References Cited

U.S. PATENT DOCUMENTS 7,391,060 B2 * 6/2008 Oshio .................. C04B 35/581 252/301.4 F
8,372,309 B2 * 2/2013 Nagatomi .......... C09K 11/7721 252/301.4 F
(Continued)

FOREIGN PATENT DOCUMENTS

CN 103299718 A 9/2013
CN 104136832 A 11/2014
(Continued)

OTHER PUBLICATIONS

International Search Report (including English translation) and Written Opinion issued in corresponding International Patent Application No. PCT/CN2017/071552, 11 pages.
(Continued)

*Primary Examiner* — Crystal L Hammond
(74) *Attorney, Agent, or Firm* — Arch & Lake LLP

(57) ABSTRACT

An example of the present disclosure discloses a light source circuit and an illumination apparatus using the same. By adjusting peak wavelengths, peak intensity and color coordinates of blue light, red light and yellow-green light in the illumination light emitted by the light source to preset ranges, an effect that the illumination light emitted by the light source circuit can improve the sense of skin color of people is achieved.

13 Claims, 4 Drawing Sheets

(51) Int. Cl.

| | |
|---|---|
| ***F21V 23/04*** | (2006.01) |
| ***H05B 33/08*** | (2006.01) |
| ***F21Y 113/10*** | (2016.01) |

(56) References Cited

U.S. PATENT DOCUMENTS

| | | | | |
|---|---|---|---|---|
| 9,373,757 | B2* | 6/2016 | Horie | H05B 33/0866 |
| 9,478,714 | B2* | 10/2016 | Horie | H05B 33/0866 |
| 2006/0045832 | A1* | 3/2006 | Nagatomi | C04B 35/581 423/325 |
| 2009/0224652 | A1* | 9/2009 | Li | C09K 11/0883 313/498 |
| 2010/0237766 | A1* | 9/2010 | Baumgartner | F21K 9/232 313/498 |
| 2012/0112626 | A1* | 5/2012 | Sakuta | H01L 33/504 313/501 |
| 2012/0218496 | A1* | 8/2012 | Izawa | C09K 11/0883 349/69 |
| 2015/0016088 | A1* | 1/2015 | Shiraichi | H01L 33/504 362/84 |
| 2016/0280993 | A1* | 9/2016 | Emoto | C09K 11/0883 |
| 2016/0290573 | A1* | 10/2016 | Allen | F21K 9/233 |
| 2016/0380163 | A1* | 12/2016 | Horie | H05B 33/0866 257/98 |

FOREIGN PATENT DOCUMENTS

| | | | |
|---|---|---|---|
| CN | 105737090 | A | 7/2016 |
| CN | 205640712 | U | 10/2016 |
| JP | 2015153945 | A | 8/2015 |
| WO | 2015050317 | A1 | 4/2015 |
| WO | 2016009991 | A1 | 1/2016 |

OTHER PUBLICATIONS

Chinese Office Action (including English translation) issued in CN201610079053.6, dated Feb. 14, 2018, 13 pages.

Chinese Office Action (including English translation) issued in CN201610079053.6, dated Sep. 20, 2018, 14 pages.

* cited by examiner

LIGHT SOURCE CIRCUIT AND ILLUMINATION APPARATUS

CROSS-REFERENCE TO RELATED APPLICATIONS

This application is based upon and claims the priority of PCT patent application No. PCT/CN2017/071552 filed on Jan. 18, 2017 which claims the priority of Chinese Patent Application No. 201610079053.6 filed on Feb. 3, 2016, and Chinese Patent Application No. 201620114044.1 filed on Feb. 3, 2016, the entire contents of all of which are hereby incorporated by reference herein for all purposes.

TECHNICAL FIELD

Examples of the present disclosure relate to a technical field of illumination, and particularly, to a light source circuit and an illumination apparatus using the same.

BACKGROUND

With rapid development of the illumination technology, an illumination apparatus has been indispensable in people's life, people live in the lighting environment in most of time, and how to improve images of people in the lighting environment is also gradually regarded.

SUMMARY

In order to solve the above-mentioned technical problem, an example of the present disclosure provides a light source circuit, including: a red light emitting portion, a blue light emitting portion, and a yellow-green light emitting portion. The red light emitting portion is configured to emit red light with a peak wavelength in a range of 600 to 640 nm. The blue light emitting portion is configured to emit blue light with a peak wavelength in a range of 440 to 460 nm. The yellow-green light emitting portion is configured to emit yellow-green light with a peak wavelength in a range of 525 to 565 nm. A peak intensity of the blue light is 65% to 100% of a peak intensity of the red light. A peak intensity of the yellow-green light is 35% to 65% of the peak intensity of the red light. Illumination light emitted by the light source circuit meets with following conditions in a CIE1931 color coordinate system. An abscissa X is in a range of 0.4015 to 0.4315; and an ordinate Y is in a range of 0.347 to 0.377.

In order to solve the above-mentioned technical problem, an example of the present disclosure provides an illumination apparatus, including: the light source circuit; a power supply circuit, connecting with the light source circuit and providing required power for the light source circuit; and a controller, connecting with the light source circuit and configured for adjusting the illumination light emitted by the light source circuit. The light source circuit includes a red light emitting portion, a blue light emitting portion, and a yellow-green light emitting portion. The red light emitting portion is configured to emit red light with a peak wavelength in a range of 600 to 640 nm. The blue light emitting portion is configured to emit blue light with a peak wavelength in a range of 440 to 460 nm. The yellow-green light emitting portion is configured to emit yellow-green light with a peak wavelength in a range of 525 to 565 nm. A peak intensity of the blue light is 65% to 100% of a peak intensity of the red light. A peak intensity of the yellow-green light is 35% to 65% of the peak intensity of the red light.

It can be seen from the technical solutions provided by the above examples of the present disclosure that, in the light source circuit and the illumination apparatus using the same which are provided by the examples of the present disclosure, the peak wavelengths, the peak intensity and color coordinates of the blue light, the red light and the yellow-green light in the illumination light emitted by the light source circuit are adjusted to the preset ranges, and an effect that the illumination light emitted by the light source circuit can improve the sense of the skin color of skin of people is achieved.

BRIEF DESCRIPTION OF THE DRAWINGS

In order to clearly illustrate the technical solution of the examples of the disclosure or the prior art, the drawings of the examples or description in the prior art will be briefly described in the following. It is obvious that the described drawings are only related to some examples of the disclosure, and those skilled in the art also can obtain other drawings, without any inventive work, according to the drawings.

DETAILED DESCRIPTION

The sense of the skin color, as an important factor of appearance, reflects the health degree and the age of a person, and can influence the social attraction of one person to a great degree. However, the sense of the skin color is largely influenced by the lighting environment. An unsuitable lighting environment will make the sense of the skin color worse, so that the personal image becomes worse.

Currently, no illumination apparatus for improving the effect of skin color presents in the market yet, resulting in that it is difficult to ensure a good sense of skin in a lighting environment.

Examples of the present disclosure provide a light source circuit and an illumination apparatus.

In order to make those skilled in the technical art understand the technical solutions of the present disclosure better, the technical solutions in the example of the present disclosure will be described in a clearly and fully understandable way in connection with the drawings in the examples of the disclosure. It is obvious that the described examples are just a part but not all of the examples of the disclosure. Based on the examples in the present disclosure, those skilled in the art can obtain all other example(s), without any inventive work, which should be within the scope of the disclosure.

An illumination apparatus in prior art is difficult to improve the skin color of people. The present disclosure provides a light source circuit and an illumination apparatus for solving the above-mentioned problem, and the above-mentioned light source circuit and illumination apparatus will be described in detail below in connection with the drawings.

Figure 1:
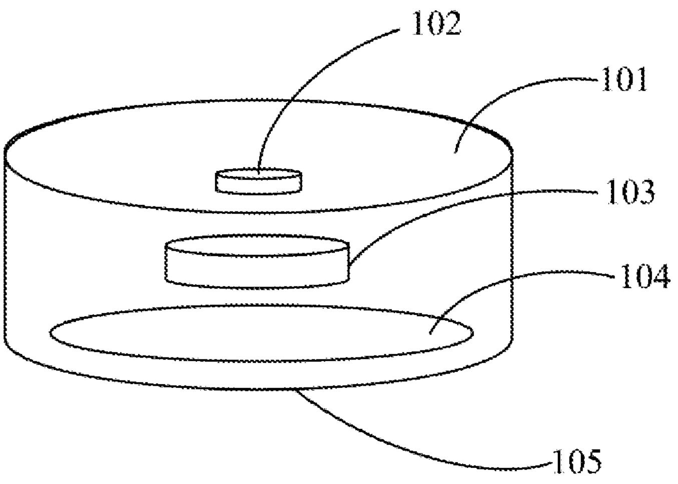
FIG. 1 is a structural schematic diagram of a light source circuit in an example of the present disclosure.

With reference to FIG. 1, the illumination apparatus 101 includes a controller 102, a heat dissipater 103, a light source circuit 104 and an optical element 105.

Certainly, the heat dissipator 103 and the optical element 105 are not indispensable elements for the illumination apparatus 101, and in some illumination scenes, such two elements can be omitted, and are not repeated herein.

The illumination apparatus 101 can be lamp in various types, for example, a ceiling lamp, a decorative lamp and even a spotlight, and application environments can be a home environment, a commercial environment and the like.

The controller 102 is configured for adjusting light color and light intensity of illumination light emitted by the light source circuit 104; the heat dissipator 102 is configured for dissipating heat generated during the light source circuit 104 emits light; and the optical element 105 includes a lens, a lampshade and the like in various types, and is configured for adjusting an illumination direction and angle of the illumination light emitted by the light source circuit 104.

Structures and working principles of the controller 102, the heat dissipator 103 and the optical element 105 are technologies well known to those skilled in the art, and will not be expanded herein.

The light source circuit 102 includes a blue light emitting portion, a red light emitting portion and a yellow-green light emitting portion, and the blue light emitting portion, the red light emitting portion and the yellow-green light emitting portion are configured to emit blue light, red light and yellow-green light respectively.

The blue light emitting portion can adopt a light emitting unit configured to emit the blue light, or can also adopt a light emitting unit for emitting light of other color to match with a blue fluorophor to emit the required blue light.

The red light emitting portion can adopt a light emitting unit configured to emit the red light, or can also adopt a light emitting unit for emitting other color of light to match with a red fluorophor to emit the required red light.

The yellow-green light emitting portion can adopt a light emitting unit configured to emit the yellow-green light, or can also adopt a light emitting unit for emitting light of other color to match with a yellow-green fluorophor to emit the required yellow-green light.

In the examples of the present disclosure, the blue light emitting portion, the red light emitting portion and the yellow-green light emitting portion can be respectively provided with independent light emitting units, or can also share one light emitting unit. For example, it can be that only the blue light emitting portion includes the light emitting unit, while the red light emitting portion and the yellow-green light emitting portion only have the fluorophors; the fluorophors of the red light emitting portion and the yellow-green light emitting portion adjust the blue light emitted by the blue light emitting portion into the corresponding red light and yellow-green light respectively by wavelength conversion.

Certainly, it can also be that only the red light emitting portion includes the light emitting unit, while the blue light emitting portion and the yellow-green light emitting portion only have the fluorophors; the fluorophors of the blue light emitting portion and the yellow-green light emitting portion adjust the red light emitted by the red light emitting portion into the corresponding blue light and yellow-green light respectively by wavelength conversion.

The light emitting unit may include a light emitting diode (LED) element. Additionally or alternatively, the light emitting unit may also be element of other types, which is not restricted herein.

The fluorophor can adopt an aluminate fluorophor, a silicate fluorophor, a nitride fluorophor, a sulfide fluorophor and the like.

It should be noted that, the yellow-green light emitting portion can include one fluorophor excited to generate yellow-green light, or may also adopt a combination of more than two types of fluorophors, e.g., a combination of a fluorophor which can be excited to generate yellow light and a fluorophor which can be excited to generate green light. The yellow-green light emitting portion can even be formed by combining fluorophors with various peak wavelengths; in this case, those fluorophors are not limited in one component. For example, different yellow-green light fluorophors in two white light LED elements can be adopted, and spectrums generated by the yellow-green light fluorophors are superimposed to obtain required spectral intensity of 515 to 560 nm. Such combination of the fluorophors is not limited to the yellow-green light emitting portion. When the blue light emitting portion and the red light emitting portion include fluorophors, fluorophors with various components can also be adopted, and those fluorophors can be distributed in different devices. In addition, the yellow-green light fluorophor herein preferably adopts a broadband fluorophor. The broadband fluorophor is a concept universal in the industry and means fluorophor powder to excite light with a relative large full width at half maximum (FWHM). The "relative large" is relative to narrowband fluorescent materials such as yttrium europium oxide (red powder), a quantum dot fluorophor and the like. The FWHM of the broadband fluorophor in the present disclosure is preferably larger than 30 nm, more preferably larger than 40 nm, particularly preferably larger than 50 nm and further particularly preferably larger than 80 nm. In addition, the red light fluorophor can also adopt the broadband fluorophor. Because the red light waveband is adjacent to the green light waveband, certain energy will be on the green light waveband when the red light emitting portion also adopts the broadband fluorophor. Thus, after the light emitted by the red light emitting portion is superimposed with the light emitted by the yellow-green light emitting portion, the light intensity of the green light waveband can also be improved to a certain degree, thereby enabling the light intensity to accord with a spectrum required by the present disclosure. It should be noted that the red light emitting portion and the yellow-green light emitting portion herein merely are a description adopted to illustrate the present disclosure. For example, the red light fluorophor with the wide emitting broadband necessarily result in a part of energy in a yellow-green light region, and in this case, it can be understood that the red light fluorophor partially achieves functions of the red light emitting portion and partially makes contribution to the yellow-green light, i.e., the yellow-green light emitting portion consists of the yellow-green light fluorophor and the red light fluorophor.

Composition of the illumination light emitted by the illumination apparatus 101 will be described below in connection with the structure of the illumination apparatus 101.

Figure 2:
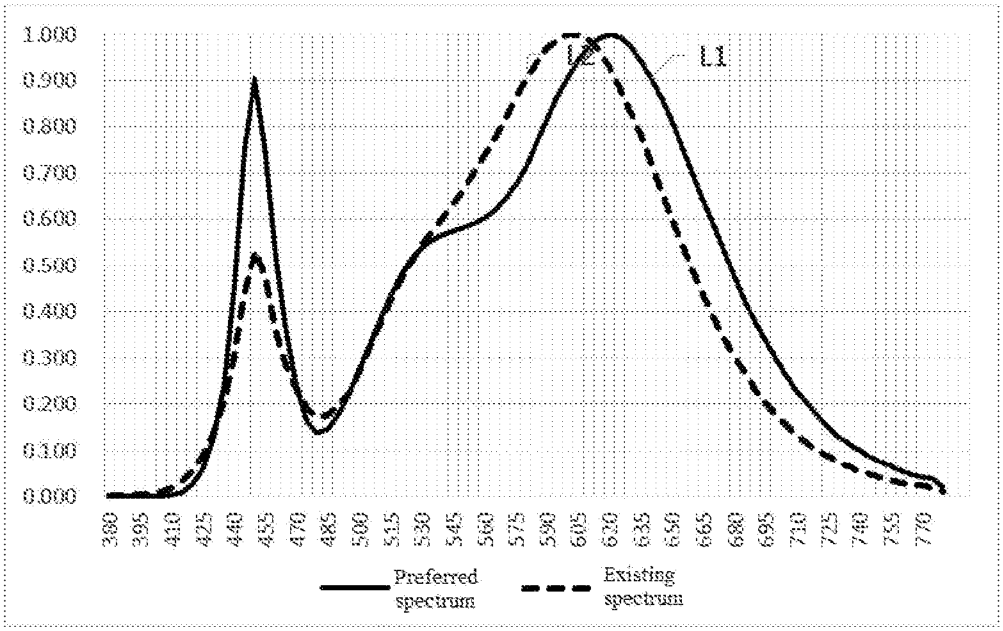
FIG. 2 is a spectrum comparison chart of illumination light emitted by an illumination apparatus in an example of the present disclosure and illumination light in the prior art at a color temperature of 3,000K.

FIG. 2 is a spectrum comparison chart of the illumination light emitted by the illumination apparatus 101 and illumination light in the prior art. L1 is a spectral distribution diagram of the illumination apparatus 101 of the present disclosure at a color temperature of 3,000K, a dotted line L2 is a spectral distribution diagram of an existing illumination apparatus at the color temperature of 3,000K, blue light with main peaks of 450 nm. Herein, main peak energy is set as a value of 1, energy of other points are represented with relative ratios to the main peak energy in the graphs. A peak of the red light of L1 is closer to a long wave than the L2, and the peak intensity of the red light of L2 is also higher. Spectral intensity of L1 at a position of 560 to 590 nm is lower than that of the L2. A great number of experiments prove that: a white degree, a ruddy degree and a health degree of the skin in an L1 lighting environment are obviously superior to those in an L2 lighting environment.

The color temperature of 3,000K is basically approximate to a color temperature range of a current home place, and the illumination light emitted by the illumination apparatus 101 provided by the present disclosure enables the sense of people's skin in the home place to be greatly improved.

In the examples of the present disclosure, a peak wavelength of the blue light is in a range of 440 to 460 nm.

A peak wavelength of the red light is in a range of 600 to 640 nm, and peak intensity of the blue light is 65% to 100% of peak intensity of the red light. When the red light is added on the basis of the blue light, the sense of the skin can be ruddier, accords with aesthetic demands of Chinese, and the health degree of the skin is also greatly improved. By setting the peak wavelength and the peak intensity of the red light, the skin shows excessively red to cause the unusual sense.

In the examples of the present disclosure, a lower limit value of the range of the ratio of the peak intensity of the blue light to the peak intensity of the red light can also be 70%, or further 80%; and an upper limit value of the range of the ratio of the peak intensity of the blue light to the peak intensity of the red light can also be 95%. By combining the upper limit value and the lower limit value in such range, for example, a range of 70% to 95% or 80% to 95% is obtained, and the red light in those ranges all can fulfill the disclosure aims of the present disclosure.

A peak wavelength of the yellow-green light is in a range of 525 to 565 nm, and peak intensity of the yellow-green light is 35% to 65% of the peak intensity of the red light. When the yellow-green light is added on the basis of the blue light and the red light, by utilizing the ability that the yellow-green light can reconcile color light, the sense of the skin is more real and truth of the sense of the skin is ensured.

In the examples of the present disclosure, a lower limit value of the range of the ratio of the peak intensity of the yellow-green light to the peak intensity of the red light can also be 40%; and an upper limit value of the range of the ratio of the peak intensity of the yellow-green light to the peak intensity of the red light can also be 60%. By combining the upper limit value and the lower limit value in such range, for example, a range of 40% to 60% is obtained, and the yellow-green light in those ranges all can fulfill the disclosure aims of the present disclosure.

When the light source circuit has no other light, the illumination light emitted by the light source circuit accords with the conditions below in a CIE1931 color coordinate system: an abscissa X is in a range of 0.4015 to 0.4315; and an ordinate Y is in a range of 0.347 to 0.377.

Color coordinates reflect a position of a measured object in a chromaticity diagram, utilize a mathematical method to represent basic parameters of colors, and the abscissa X and the ordinate Y can be obtained in a mode that: after a spectrum P (λ) is obtained, tristimulus functions x(λ), y(λ) and z(λ) are respectively multiplied by corresponding wavelengths in the spectrum P(λ), and then are accumulated to obtain tristimulus values x, y, z; and then three stimulus values x, y and z are subjected to conversion to obtain that the abscissa X of the color coordinates is X=X/(x+y+z) and the ordinate Y of the color coordinates is Y=Y/(x+y+z). The above is a technology well known to those skilled in the art, and will not be expanded herein.

It should be noted that when the illumination light emitted by the light source circuit is determined to accord with the above-mentioned conditions in the CIE1931 color coordinate system, there is no any light in the environment where the light source circuit is positioned, so as to avoid a case that due to other light doped in the illumination light emitted by the light source circuit, the illumination light emitted by the light source circuit is polluted and the position of the illumination light emitted by the light source circuit in the chromaticity diagram cannot be accurately determined. Here, the CIE 1931 color coordinate system is the first defined quantitative links between distributions of wavelengths in the electromagnetic visible spectrum, and physiologically perceived colors in human color vision, where CIE stands for International Commission on Illumination.

In the examples of the present disclosure, the light source circuit can be placed in a dark room or a black box isolated from the outside light, so that there is no other light in the environment where the light source circuit is positioned, thereby determining that the illumination light emitted by the light source circuit accords with the above-mentioned conditions in the CIE1931 color coordinate system.

In the examples of the present disclosure, the conditions in the color coordinate system can be adjusted to: the abscissa X is in a range of 0.4065 to 0.4265; and the ordinate Y is in a range of 0.352 to 0.372.

In the examples of the present disclosure, the conditions in the color coordinate system can be adjusted to: the abscissa X is in a range of 0.4115 to 0.4225; and the ordinate Y is in a range of 0.357 to 0.367.

The illumination apparatus provided by the present disclosure is mainly applied to illumination to improve the sense of the skin. The illumination light needs to be a light color close to white color, and only when the light color falls within the above-defined range of the CIE1931 color coordinate system, conventional illumination capacity can be implemented and meanwhile, the white degree, the ruddy degree, the health degree, naturality and vitality of the skin can be promoted.

For various combination modes above, several preferable examples of the illumination apparatus 101 will be illustrated below.

Figure 3:
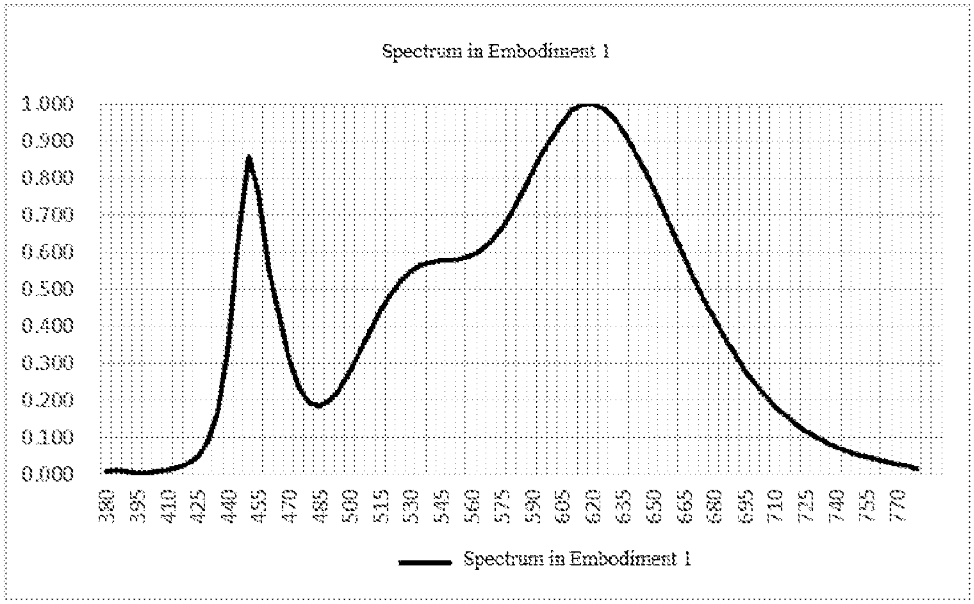
FIG. 3 is a relative spectral energy distribution diagram of an example.

According to an example 1, a blue light LED chip, as the blue light emitting portion, with a peak wavelength of 450±5 nm is arranged on the illumination apparatus 101, the red light fluorophor which can convert part of the blue light emitted by the blue light emitting portion into the red light is adopted as the red light emitting portion, and the yellow-green light fluorophor which can convert part of the blue light emitted by the blue light emitting portion into the yellow-green light is adopted as the yellow-green light emitting portion. In the example, the blue light LED chip is not only adopted as the blue light emitting portion, but also is an exciting light source of the red light emitting portion and the yellow-green light emitting portion. FIG. 3 is a relative spectral energy distribution diagram of the example 1. The blue light emitted by the blue light LED chip forms a first peak, a light-emitting peak wavelength of the first peak is positioned at a position of 450 nm, and a FWHM of the first peak is about 20 nm. The red light fluorophor converts part of the blue light emitted by the blue light LED chip into red light with a wavelength of 600 to 640 nm to form a second peak, a light-emitting peak wavelength of the second peak is positioned at a positioned of 620 nm, and peak intensity of the first peak is about 85% of peak intensity of the second peak. The yellow-green light fluorophor converts part of the blue light emitted by the blue light LED chip into the yellow-green light with a wavelength of 525 nm to 565 nm to form a step, a light-emitting wavelength is positioned in a range of 535 nm to 555 nm, and intensity is about 50% to 60% of the intensity of the second peak. In the example 1, the color coordinates are that x=0.4165 and y=0.362, which accord with the preferred spectral values obtained by the experiments.

Figure 4:
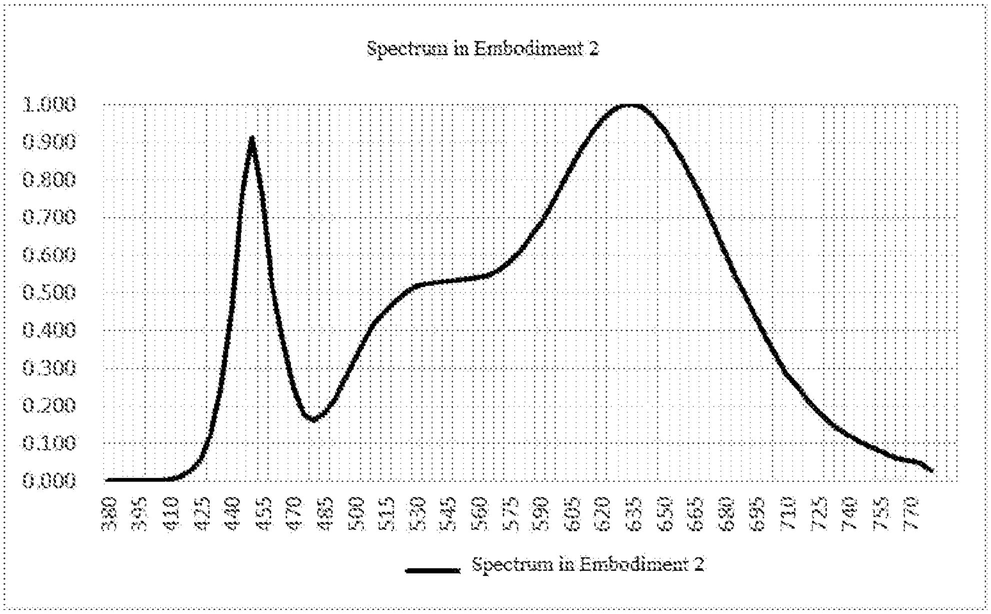
FIG. 4 is a relative spectral energy distribution diagram of a second example.

According to an example 2, a blue light LED chip, as the blue light emitting portion, with a peak wavelength of 450±5 nm is arranged on the illumination apparatus 101, the red light fluorophor which can convert part of the blue light emitted by the blue light emitting portion into the red light is adopted as the red light emitting portion, and the yellow-green light fluorophor which can convert part of the blue light emitted by the blue light emitting portion into the yellow-green light is adopted as the yellow-green light emitting portion. In the example, the blue light LED chip is not only adopted as the blue light emitting portion, but also is an exciting light source of the red light emitting portion and the yellow-green light emitting portion. FIG. 4 is a relative spectral energy distribution diagram of the example 2, the blue light emitted by the blue light LED chip forms a first peak, a light-emitting peak wavelength of the first peak is positioned at a position of 450 nm, and a FWHM of the first peak is about 20 nm. The red light fluorophor converts part of the blue light emitted by the blue light LED chip into red light with a wavelength of 600 to 640 nm to form a second peak, a light-emitting peak wavelength of the second peak is positioned at a positioned of 635 nm, and peak intensity of the first peak is about 90% of peak intensity of the second peak. The yellow-green light fluorophor converts part of the blue light emitted by the blue light LED chip into the yellow-green light with a wavelength of 525 nm to 565 nm to form a step, a light-emitting wavelength is positioned in a range of 535 nm to 555 nm, and intensity is about 50% to 60% of the intensity of the second peak. In the example 2, the color coordinates are that x=0.4098 and y=0.3532, which accord with the preferred spectral values obtained by the experiments.

Figure 5:
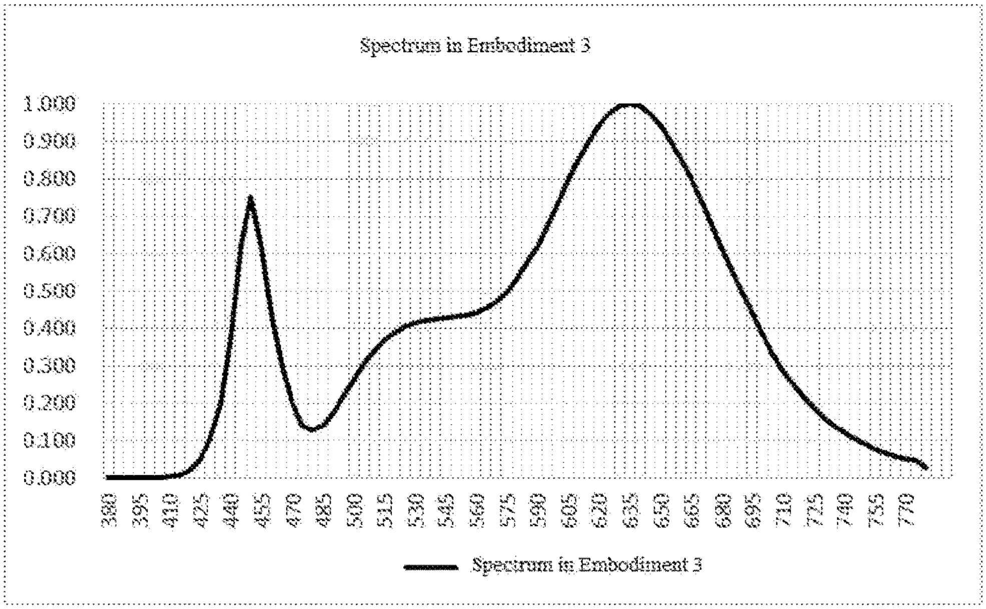
FIG. 5 is a relative spectral energy distribution diagram of a third example.

According to an example 3, a blue light LED chip, as the blue light emitting portion, with a peak wavelength of 450±5 nm is arranged on the illumination apparatus 101, the red light fluorophor which can convert part of the blue light emitted by the blue light emitting portion into the red light is adopted as the red light emitting portion, and the yellow-green light fluorophor which can convert part of the blue light emitted by the blue light emitting portion into the yellow-green light is adopted as the yellow-green light emitting portion. In the example, the blue light LED chip is not only adopted as the blue light emitting portion, but also is an exciting light source of the red light emitting portion and the yellow-green light emitting portion. FIG. 5 is a relative spectral energy distribution diagram of the example 3, the blue light emitted by the blue light LED chip forms a first peak, a light-emitting peak wavelength of the first peak is positioned at a position of 450 nm, and a FWHM of the first peak is about 20 nm. The red light fluorophor converts part of the blue light emitted by the blue light LED chip into red light with a wavelength of 600 to 640 nm to form a second peak, a light-emitting peak wavelength is positioned at a positioned of 635 nm, and peak intensity of the first peak is about 75% of peak intensity of the second peak. The yellow-green light fluorophor converts part of the blue light emitted by the blue light LED chip into the yellow-green light with a wavelength of 525 nm to 565 nm to form a step, a light-emitting wavelength is positioned in a range of 535 nm to 555 nm, and intensity is about 40% to 50% of the intensity of the second peak. In the example 3, the color coordinates are that x=0.4284 and y=0.3508, and accord with the preferred spectral values obtained by the experiments.

Figure 6:
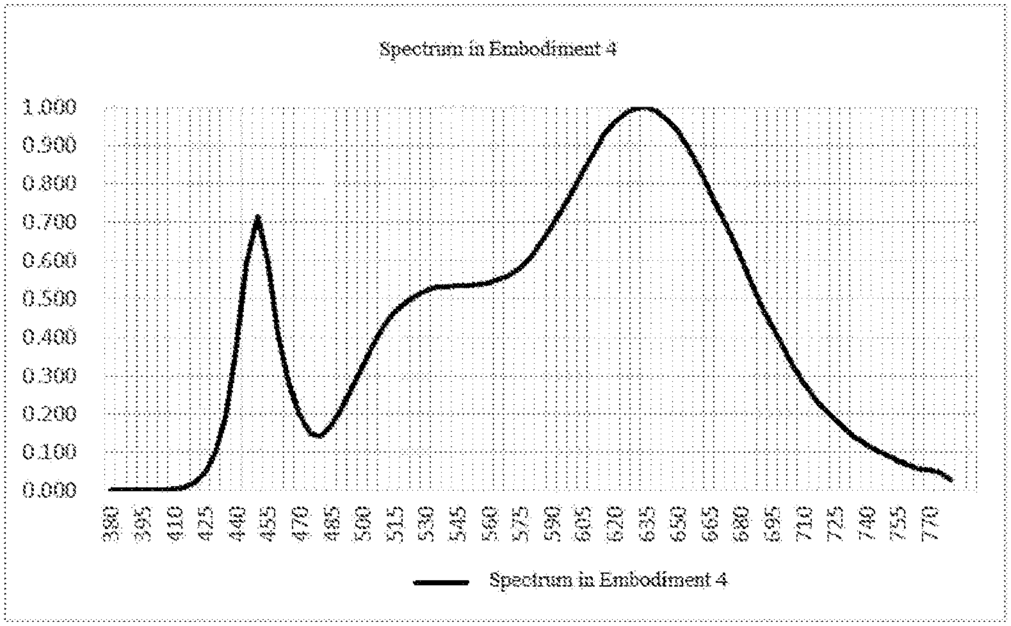
FIG. 6 is a relative spectral energy distribution diagram of a fourth example.

According to an example 4, a blue light LED chip, as the blue light emitting portion, with a peak wavelength of 450±5 nm is arranged on the illumination apparatus 101, the red light fluorophor which can convert part of the blue light emitted by the blue light emitting portion into the red light is adopted as the red light emitting portion, and the yellow-green light fluorophor which can convert part of the blue light emitted by the blue light emitting portion into the yellow-green light is adopted as the yellow-green light emitting portion. In the example, the blue light LED chip is not only adopted as the blue light emitting portion, but also is an exciting light source of the red light emitting portion and the yellow-green light emitting portion. FIG. 6 is a relative spectral energy distribution diagram of the example 4, the blue light emitted by the blue light LED chip forms a first peak, a light-emitting peak wavelength of the first peak is positioned at a position of 450 nm, and a FWHM of the first peak is about 20 nm. The red light fluorophor converts part of the blue light emitted by the blue light LED chip into red light with a wavelength of 600 to 640 nm to form a second peak, a light-emitting peak wavelength is positioned at a positioned of 635 nm, and peak intensity of the first peak is about 71% of peak intensity of the second peak. The yellow-green light fluorophor converts part of the blue light emitted by the blue light LED chip into the yellow-green light with a wavelength of 525 nm to 565 nm to form a step, a light-emitting wavelength is positioned in a range of 535 nm to 555 nm, and intensity is about 50% to 60% of the intensity of the second peak. In the example 4, the color coordinates are that x=0.4246 and y=0.3733, and accord with the preferred spectral values obtained by the experiments.

Figure 7:
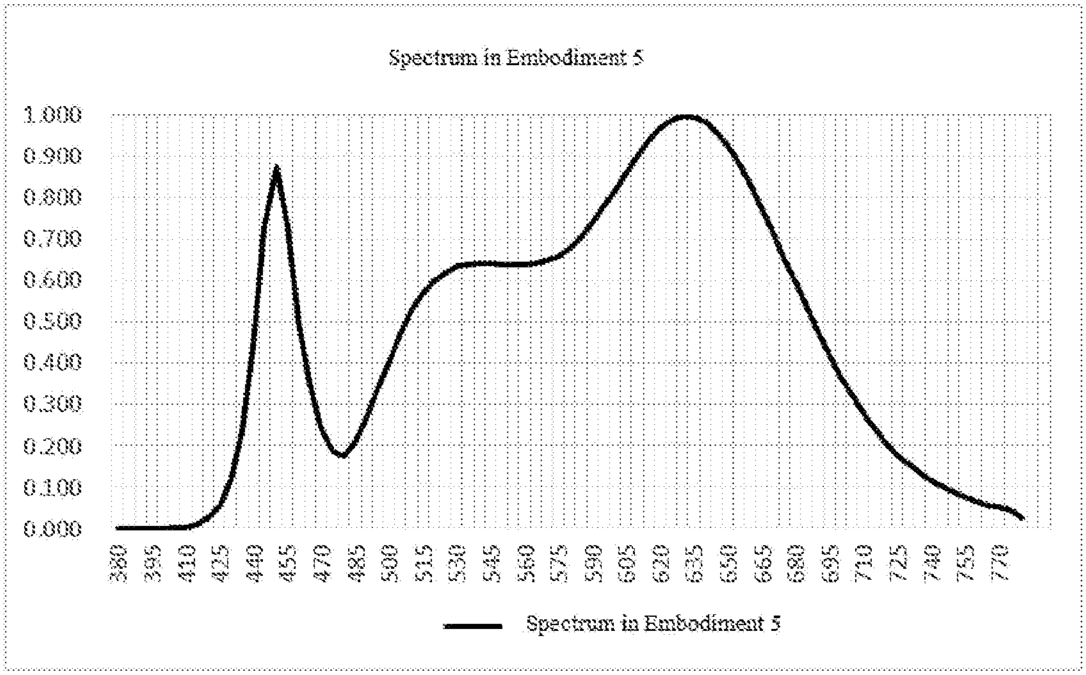
FIG. 7 is a relative spectral energy distribution diagram of illumination light emitted by an illumination apparatus in a fifth example.

According to an example 5, a blue light LED chip, as the blue light emitting portion, with a peak wavelength of 450±5 nm is arranged on the illumination apparatus 101, the red light fluorophor which can convert part of the blue light emitted by the blue light emitting portion into the red light is adopted as the red light emitting portion, and the yellow-green light fluorophor which can convert part of the blue light emitted by the blue light emitting portion into the yellow-green light is adopted as the yellow-green light emitting portion. In the example, the blue light LED chip is not only adopted as the blue light emitting portion, but also is an exciting light source of the red light emitting portion and the yellow-green light emitting portion. FIG. 7 is a relative spectral energy distribution diagram of the example 5, the blue light emitted by the blue light LED chip forms a first peak, a light-emitting peak wavelength of the first peak is positioned at a position of 450 nm, and a FWHM of the first peak is about 20 nm. The red light fluorophor converts part of the blue light emitted by the blue light LED chip into red light with a wavelength of 600 to 640 nm to form a second peak, a light-emitting peak wavelength is positioned at a positioned of 630 nm, and peak intensity of the first peak is about 87% of peak intensity of the second peak. The yellow-green light fluorophor converts part of the blue light emitted by the blue light LED chip into the yellow-green light with a wavelength of 525 nm to 565 nm to form a step, a light-emitting wavelength is positioned in a range of 535 nm to 555 nm, and intensity is about 65% of the intensity of the second peak. In the example 5, the color coordinates are that x=0.4055 and y=0.3739, which accord with the preferred spectral values obtained by the experiments.

In the disclosure, the peak intensity of the blue light is 70% to 95% of the peak intensity of the red light. Preferably, the peak intensity of the blue light is 80% to 95% of the peak intensity of the red light. Preferably, the peak intensity of the yellow-green light is 40% to 60% of the peak intensity of the red light. Preferably, the abscissa X is in a range of 0.4065 to 0.4265; and the ordinate Y is in a range of 0.352 to 0.372. Preferably, the abscissa X is in a range of 0.4115 to 0.4225; and the ordinate Y is in a range of 0.357 to 0.367.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "portion," "circuit," "sub-circuit," "circuitry," "sub-circuitry," "unit," or "sub-unit" may include memory (shared, dedicated, or group) that stores code or instructions that can be executed by one or more processors. The module or portion may be a hardware component or an element with or without an electronic circuit.

Each example in this specification is described in a progressive mode, the same and similar parts among the examples can refer to each other, and each example is focused on illustration of differences from other examples. Particularly, a system example is basically similar to a method example, and thus, the system example is relatively simply described, and related parts can refer to part of illustration in the method example.

The above merely are the examples of the present disclosure, but not intended to limit the present disclosure. For those skilled in the art, various modifications and changes can be made to the present disclosure. Any modifications, equivalent replacements, improvements and the like made without departure from the spirit and the principle of the present disclosure all shall fall within the scope of the claims of the present disclosure.

The invention claimed is:

1. A light source circuit, comprising:
- a red light emitting portion configured to emit red light;
- a blue light emitting portion configured to emit blue light;
- a yellow-green light emitting portion configured to emit yellow-green light;
- a peak wavelength of the red light being in a range of 600 to 640 nm;
- a peak wavelength of the blue light being in a range of 440 to 460 nm;
- a peak wavelength of the yellow-green light being in a range of 525 to 565 nm;
- a peak intensity of the blue light being 65% to 100% of a peak intensity of the red light;
- a peak intensity of the yellow-green light being 35% to 65% of the peak intensity of the red light; and
- illumination light emitted by the light source circuit meeting with following conditions in a CIE1931 color coordinate system: an abscissa X is in a range of 0.4015 to 0.4315; and an ordinate Y is in a range of 0.347 to 0.377.

2. The light source circuit according to claim 1, wherein the peak intensity of the blue light is 70% to 95% of the peak intensity of the red light.

3. The light source circuit according to claim 2, wherein the peak intensity of the blue light is 80% to 95% of the peak intensity of the red light.

4. The light source circuit according to claim 1, wherein the peak intensity of the yellow-green light is 40% to 60% of the peak intensity of the red light.

5. The light source circuit according to claim 1, wherein the abscissa X is in a range of 0.4065 to 0.4265; and the ordinate Y is in a range of 0.352 to 0.372.

6. The light source circuit according to claim 5, wherein the abscissa X is in a range of 0.4115 to 0.4225; and the ordinate Y is in a range of 0.357 to 0.367.

7. An illumination apparatus, comprising a light source circuit that comprises:
- a red light emitting portion configured to emit red light;
- a blue light emitting portion configured to emit blue light;
- a yellow-green light emitting portion configured to emit yellow-green light;
- a peak wavelength of the red light being in a range of 600 to 640 nm;
- a peak wavelength of the blue light being in a range of 440 to 460 nm;
- a peak wavelength of the yellow-green light being in a range of 525 to 565 nm;
- a peak intensity of the blue light being 65% to 100% of a peak intensity of the red light;
- a peak intensity of the yellow-green light being 35% to 65% of the peak intensity of the red light;
- a power supply circuit, connecting with the light source circuit and providing required power for the light source circuit; and
- a controller, connecting with the light source circuit and configured for adjusting the illumination light emitted by the light source circuit.

8. The illumination apparatus according to claim 7, wherein the peak intensity of the blue light is 70% to 95% of the peak intensity of the red light.

9. The illumination apparatus according to claim 8, wherein the peak intensity of the blue light is 80% to 95% of the peak intensity of the red light.

10. The illumination apparatus according to claim 7, wherein the peak intensity of the yellow-green light is 40% to 60% of the peak intensity of the red light.

11. The illumination apparatus according to claim 7, wherein the abscissa X is in a range of 0.4065 to 0.4265; and the ordinate Y is in a range of 0.352 to 0.372.

12. The illumination apparatus according to claim 11, wherein the abscissa X is in a range of 0.4115 to 0.4225; and the ordinate Y is in a range of 0.357 to 0.367.

13. The illumination apparatus according to claim 7, wherein illumination light emitted by the light source circuit meet with following conditions in an International Commission on Illumination (CIE) color coordinate system: an abscissa X is in a range of 0.4015 to 0.4315; and an ordinate Y is in a range of 0.347 to 0.377.

* * * * *